United States Patent [19]

Vivian, Jr.

[11] 4,327,601
[45] May 4, 1982

[54] STEERING WHEEL HAVING INCLINED LEAF SPRING CORE

[75] Inventor: Lloyd R. Vivian, Jr., Birmingham, Mich.

[73] Assignee: Ford Motor Company, Dearborn, Mich.

[21] Appl. No.: 960,151

[22] Filed: Nov. 13, 1978

[51] Int. Cl.³ .......................... B62D 1/04; G05G 1/10
[52] U.S. Cl. ....................................... 74/552; 403/185
[58] Field of Search .................. 74/552; 403/393, 185

[56] References Cited

U.S. PATENT DOCUMENTS

| | | | |
|---|---|---|---|
| 1,823,980 | 9/1931 | Karrer | 74/552 |
| 2,040,739 | 5/1936 | Beck | 74/552 |
| 2,596,784 | 5/1952 | Nagin | 74/552 |
| 2,810,301 | 10/1957 | Mathues | 74/552 |
| 2,814,211 | 11/1957 | Hoagg | 74/552 |
| 2,889,714 | 6/1959 | Romano | 74/493 |
| 3,321,996 | 5/1967 | Cardinale | 74/552 |
| 3,468,188 | 9/1969 | MacCoon | 74/552 |
| 3,613,476 | 10/1971 | Cunningham | 74/492 |
| 4,010,658 | 3/1977 | Muller et al. | 74/552 |
| 4,010,659 | 3/1977 | Muller et al. | 74/552 |
| 4,011,643 | 3/1977 | Muller et al. | 29/159 B |
| 4,011,644 | 3/1977 | Muller et al. | 29/159 B |
| 4,011,645 | 3/1977 | Muller | 29/159 B |
| 4,011,772 | 3/1977 | Muller | 74/552 |
| 4,011,773 | 3/1977 | Muller et al. | 74/552 |

FOREIGN PATENT DOCUMENTS 690564 7/1964 Canada ................................ 403/393

Primary Examiner—Kenneth Dorner
Attorney, Agent, or Firm—Steven L. Permut; Clifford L. Sadler

[57] ABSTRACT

A flexible steering wheel rim having an upper portion with a stack of arcuate leaf springs canted forwardly and toward the steering wheel. The leaf springs are mounted to a seat in the lower portion of the rim which has a flat surface inclined fowardly and toward the center of the steering wheel. A clamp circumscribes the wire and leaf springs and has a rearward wall which is pitched rearwardly and toward the center of the steering wheel. The leaf springs are deformable upon impact in a forward or rearward direction parallel to the axis of the steering wheel. The leaf springs flex when a rear axial force is present such that they become canted rearward and toward the center of the steering wheel.

3 Claims, 8 Drawing Figures

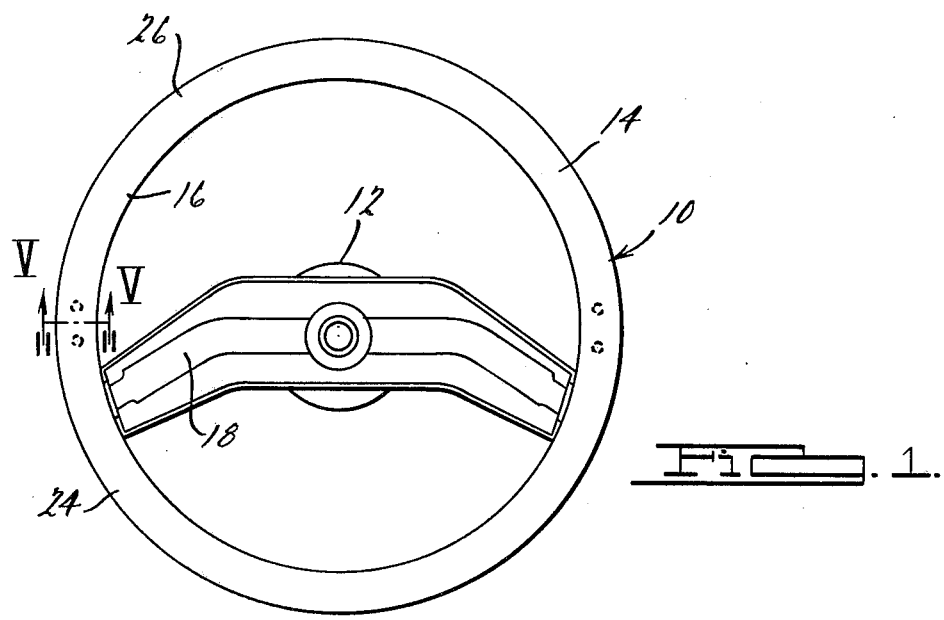
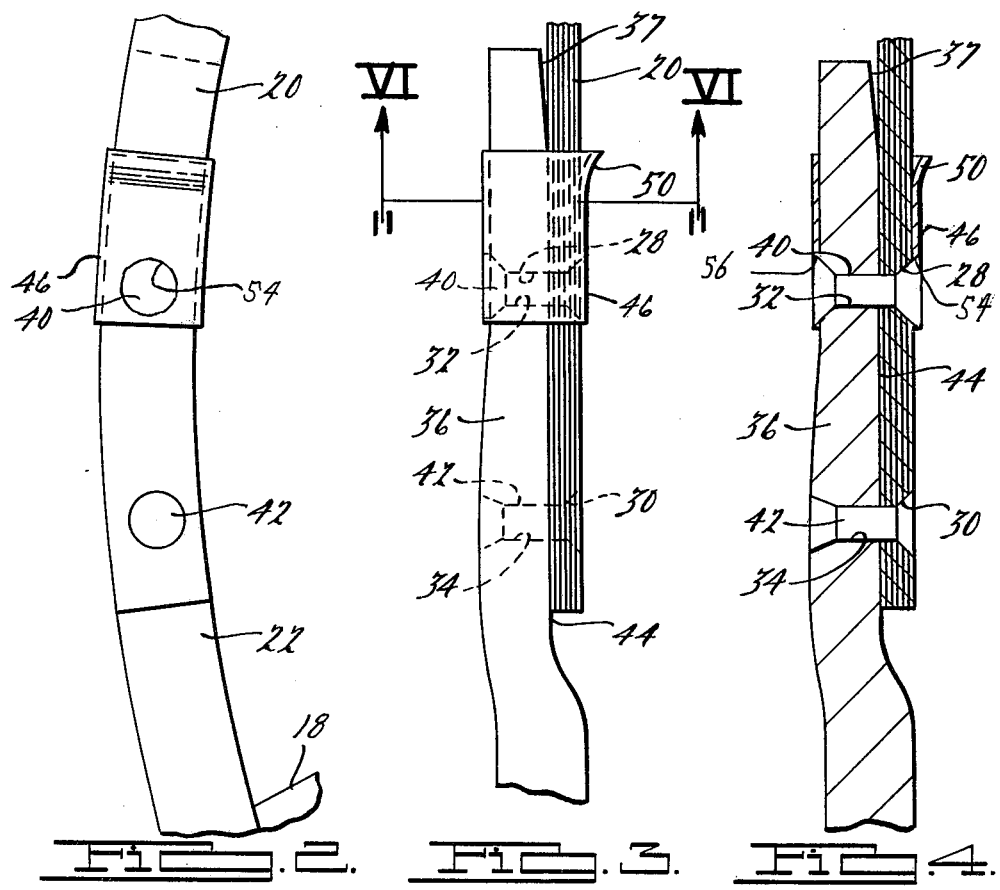

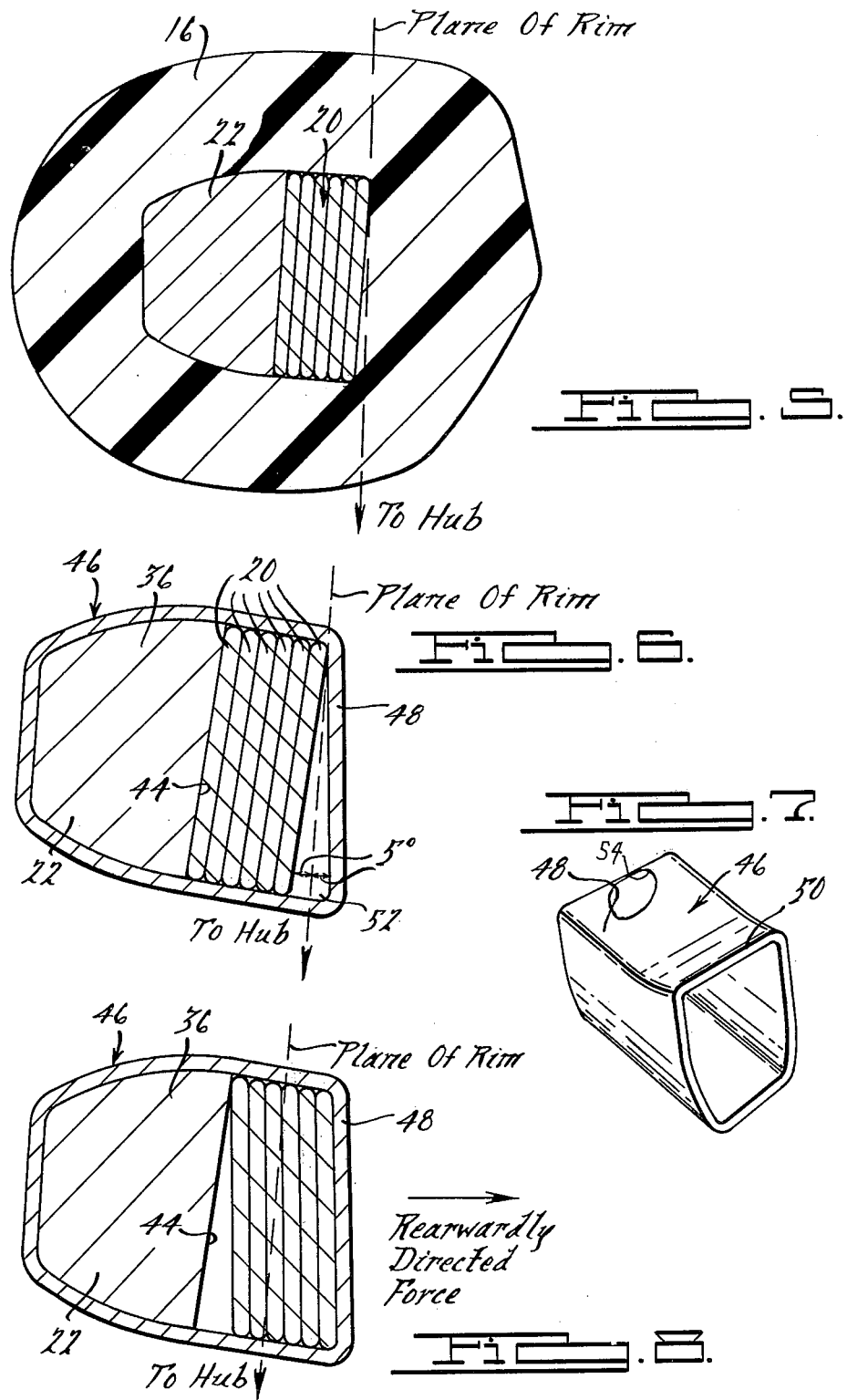

STEERING WHEEL HAVING INCLINED LEAF SPRING CORE

BACKGROUND OF THE INVENTION

1. Field of the Invention

This invention relates generally to steering wheels for motor vehicles and more particularly to a steering wheel construction which contains a flexible leaf spring core that is resiliently deflectable to absorb impact loads.

2. Description of the Prior Art

Steering wheels have been disclosed which have resilient rims that are deflectable under an impact load. Deflection of the rim causes the portion of the load to be absorbed. Such energy absorbing flexible rims are disclosed in U.S. Pat. Nos. 4,010,658 and 4,010,659 issued to Muller on Mar. 8, 1977; U.S. Pat. Nos. 4,011,643; 4,011,644 and 4,011,773 issued to Muller et al on Mar. 15, 1977; and U.S. Pat. Nos. 4,011,645 and 4,011,772 issued to Muller on Mar. 15, 1977. The above identified patents disclose a rim with a flexible leaf spring core.

SUMMARY OF THE INVENTION

According to the invention, a steering wheel has a hub, a rim with a lower portion and upper portion covered with an outer covering and a spoke assembly interconnecting the hub with the lower portion of the rim. The upper portion of the rim has a core including a stack of leaf springs each of which is arcuate in shape from the plan view of the rim. Each leaf spring is canted forwardly to the front of the steering wheel column and toward the hub. Preferably, the can is slight, defining an angle between two and eight degrees. Five degrees is a suitable inclination. Each leaf spring has ends which are mounted to a lower portion of the rim.

In one embodiment, the leaf springs have apertures aligned with each other. The aligned apertures are also aligned with an aperture through an upper end of the lower portion of the rim. Fasteners, such as rivets, extend through the aligned apertures and fasten the leaf springs to the lower portion of the rim.

In one embodiment, a clamp surrounds the lower portion of the rim and leaf springs to tightly retain the leaf springs to the lower portion. The leaf springs, spoke assembly, and lower portion are encased in a flexible plastic covering to provide a surface that can be easily gripped.

In one embodiment, the clamp has a rearward surface which is slanted rearwardly toward the hub which creates a wedge-shaped gap between the leaf springs and the surface. The gap allows the leaf springs to flex therein when a rearwardly directed force parallel to the axis of the steering wheel is applied to the leaf springs such that the leaf springs become inclined rearwardly and toward the axis of the hub.

The leaf springs are flexible to be deformed when either a rearward or forward directed force parallel to the axis of the steering wheel is applied thereon and strong enough to withstand torque forces applied thereon when an operator normally rotates the steering wheel.

The inclinations of the clamp and the leaf springs provides for a long lasting flexible steering wheel which can repeatedly undergo axial flexing.

BRIEF DESCRIPTION OF THE DRAWINGS

Reference now will be made to the following drawings in which:

FIG. 1 is a forward directed plan view of a steering wheel incorporating a preferred embodiment of the invention.

FIG. 2 is an enlarged fragmentary and sectional view showing the seat where the upper leaf springs are connected to the lower portion of the rim.

FIG. 3 is a side elevational view of the leaf springs mounted to the lower portion of the rim in which the front of the steering wheel is to the left and the passenger side of the steering wheel is to the right.

Fig. 4 is a partially segmented view of FIG. 3.

FIG. 5 is a cross-sectional view taken along the lines V—V of FIG. 1.

FIG. 6 is a cross-sectional view taken along the lines VI—VI shown in FIG. 3.

FIG. 7 is a perspective view of the clamp shown in FIG. 3.

FIG. 8 is a cross-sectional view as shown in FIG. 6 with the leaf springs flexed in an opposite inclination.

DETAILED DESCRIPTION OF THE PREFERRED EMBODIMENT

Referring now to the drawings wherein the preferred embodiment of this invention is illustrated, FIG. 1 discloses a steering wheel 10 having a central hub 12, a rim 14, spokes 18 connecting the hub to the rim and an outer covering 16 covering the spokes 18 and rim 14.

As shown in FIG. 2, inside the outer covering 16 is a stack of leaf springs 20 connected to a substantially rigid wire 22. The wire 22 forms a lower portion 24 of the rim 14 and the leaf springs 20 form an upper portion 26 of the rim 14. The spokes 18 are connected to the substantially rigid wire 22.

Referring now to FIGS. 3 and 4, wire 22 has at its upper ends a seat portion 36. The seat portion 36 has a smooth surface 44 which is offset forwardly. In addition, surface 44 is canted forwardly and toward the hub 12 as shown in FIGS. 5 and 6 at approximately a 5° angle. Seat portion 36 has a tapered section 37 at its extremities.

The leaf springs 20 have apertures 28 and 30 aligned with apertures 32 and 34 through seat portion 36 of the wire 22. Rivet 40 extends through aligned apertures 32 and 28 and rivet 42 extends through aligned apertures 34 and 30 to tightly fasten the leaf springs 20 to the seat portion 36. In addition, the leaf springs 20 as shown in FIG. 5 abut surface 44 and are canted forwardly and toward the hub at approximately a 5° angle.

As shown in FIGS. 3, 4, 6 and 7 a tubular clamp 46 tightly circumscribes the leaf springs 20 and seat portion 36 of wire 22. The clamp 46 has a rear wall 48 which is flared at its upper end 50. In addition, wall 48 is sloped rearwardly towards the hub 12 forming a wedge shaped gap 52 between wall 48 and leaf springs 20. The clamp 48 has aligned apertures 54 and 56 through which rivet 40 extends.

In operation, the leaf spring upper portion 26 covered by the flexible plastic outer covering 16 is deformable upon an impact directed parallel to the axis of the steering wheel. Upon a forward directed impact, the leaf springs 20 flex along the tapered section 37 of the seat portion 36 in a forward direction. When the forward force is terminated, the flexed leaf springs 20 resiliently spring back to their initial position.

If a rearward directed force is exerted upon leaf springs 20, the leaf springs 20 flex such that the cant changes and the leaf springs become canted approximately 5° rearwardly toward the hub filling the gap 52 as shown in FIG. 8. In addition, the rearward force flexes the leaf springs 20 against the flared end 50 of the clamp wall 48. The wall 48 retains the leaf springs in the 5° rearwardly canted position.

When the rearward force is terminated, leaf springs flex back to their initial position at the cant of 5° forwardly toward the hub with leaf springs abutting the inclined surface 44 of the wire 22.

The cant of the leaf springs forwardly toward the hub greatly reduces the stress exerted upon the leaf springs. The reduction of stress elongates the lifespan of the leaf springs. In addition, the leaf springs can also undergo flexing the rearward direction without excessive stress. The unique sloped wall of the clamp 46 allows for the leaf springs to flex to its rearwardly canted position as well as retain its initial forwardly canted position as shown in FIG. 5.

Variations and modifications are possible within the scope of the foregoing disclosure and drawings without departing from the spirit of the invention which is defined by the appended claims.

We claim:

1. A steering wheel for motor vehicle comprising:
   a hub;
   rim having a lower portion, upper portion, and spoke assembly interconnecting the hub with the lower portion of the rim;
   said lower and upper portions having a flexible outer covering;
   said upper portion of said rim including a core of a plurality of stacked arcuate leaf springs;
   each leaf spring being canted forwardly and toward the hub;
   seat means mounting said leaf springs onto said lower portion of the rim;
   said seat means comprising said lower portion of the rim having a seat portion in each upper end thereof with a smooth surface abutting one surface of one of the leaf springs;
   said smooth surface being canted forwardly toward the hub;
   said seat portions of said lower portion having apertures therethrough;
   said stack of leaf springs having apertures therethrough aligned with aperture of said lower portions;
   fasteners extending through the aligned apertures and fastening the leaf springs to the seat portions of the lower portions;
   a clamp tightly surrounding each seat portion and stacked leaf springs above the fasteners;
   said upper portion being deformable in response to an impact imposed thereon in a direction parallel to the axis of said steering wheel;
   said upper portion being constructed to be substantially rigid with respect to a tangential force applied by a vehicle operator to said upper portion for the purpose of turning said steering wheel;
   said clamp being tubular in shape and having a rear wall with a surface facing the leaf springs and canted rearwardly and toward the hub leaving a wedge shaped gap between the leaf springs and said rear wall which allows a rearwardly directed force parallel to the axis of said steering wheel to flex the leaf springs such that said leaf springs become canted rearward and toward the hub filling said gaps;
   said leaf springs being constructed to flex back to their original cant when said rearwardly directed force is terminated.

2. A steering wheel as defined in claim 1 wherein the clamp is tubular in shape with a widened flared end which flares away from the leaf springs; and said seat portion of the lower portion has a tapered end above the smooth surface which curves away from the leaf springs.

3. A steering wheel as defined in claim 2 wherein the tubular clamps extend over the fasteners.

* * * * *